(12) United States Patent  
Loussides et al.

(10) Patent No.: US 12,548,099 B2
(45) Date of Patent: Feb. 10, 2026

(54) SYSTEMS AND METHODS FOR PRIORITIZED FIRE SUPPRESSION

(71) Applicant: Lockheed Martin Corporation, Bethesda, MD (US)

(72) Inventors: George Nicholas Loussides, West Haven, CT (US); Michael Paul Baran, Prospect, CT (US); Sean Carlson, New Milford, CT (US); Carl John Pankok, Philadelphia, PA (US); Alexander Quinn Weintraub, Wilton, CT (US); Igor Cherepinsky, Sandy Hook, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 383 days.

(21) Appl. No.: 17/491,124

(22) Filed: Sep. 30, 2021

(65) Prior Publication Data

US 2023/0107622 A1 Apr. 6, 2023

(51) Int. Cl.
*G06Q 50/26* (2024.01)
*A62C 3/02* (2006.01)
(Continued)

(52) U.S. Cl.
CPC ............. *G06Q 50/265* (2013.01); *B64D 1/16* (2013.01); *G06N 20/00* (2019.01); *A62C 3/0228* (2013.01)

(58) Field of Classification Search
CPC ........ G06Q 50/265; B64D 1/16; G06N 20/00; G06N 3/0442; G06N 3/0464; G06N 3/048;
(Continued)

(56) References Cited

U.S. PATENT DOCUMENTS 9,454,151 B2 * 9/2016 Srivastava ............... G08G 1/00
9,671,790 B2 * 6/2017 Srivastava ............. G08G 5/045
(Continued)

FOREIGN PATENT DOCUMENTS

AU 2021106077 A4 * 12/2021 ........... A62C 3/0228
CN 110302488 A * 10/2019 ............. A62C 37/00
(Continued)

OTHER PUBLICATIONS

Moulay, "Unmanned aerial vehicle for wildland fires" (Year: 2021).*
(Continued)

*Primary Examiner* — Sangeeta Bahl
(74) *Attorney, Agent, or Firm* — Foley & Lardner LLP

(57) ABSTRACT

A system for providing instructions directed to facilitating the completion of an aerial mission in an environment includes one or more sensors mounted on a vehicle; a transceiver configured to transmit an instruction directed to facilitating the completion of the mission to an electronic display; and a server comprising a processor coupled to memory of the vehicle containing processor-readable instructions. The instructions causing the processor to, responsive to receiving a factor associated with the mission, compute the instruction directed to facilitating the completion of the mission based on adjusting a cost function, the factor being at least one of a boundary condition of the cost function or a constraint of the cost function.

10 Claims, 7 Drawing Sheets

(51) Int. Cl.
*B64D 1/16* (2006.01)
*G06N 20/00* (2019.01)

(58) Field of Classification Search
CPC .......... G06N 3/006; G06N 3/084; G06N 3/09;
G06N 3/098; G06N 3/092; A62C 3/0228
See application file for complete search history.

(56) References Cited

U.S. PATENT DOCUMENTS

| | | | |
|---|---|---|---|
| 10,046,187 B2 | 8/2018 | Doten | |
| 10,139,819 B2* | 11/2018 | Hollida | G05D 1/0094 |
| 10,146,187 B2* | 12/2018 | Patton | G04C 23/38 |
| 10,388,049 B2 | 8/2019 | Songa et al. | |
| 10,410,291 B1* | 9/2019 | Binion | G06Q 40/08 |
| 10,569,875 B2 | 2/2020 | Flood et al. | |
| 2018/0090016 A1* | 3/2018 | Nishi | G08G 5/76 |
| 2019/0033861 A1* | 1/2019 | Groden | G05D 1/0055 |
| 2019/0314657 A1* | 10/2019 | Hofmann | A62C 27/00 |
| 2022/0365534 A1* | 11/2022 | Kuhlman | G05D 1/104 |
| 2023/0020135 A1* | 1/2023 | Ferguson | G08G 5/56 |

FOREIGN PATENT DOCUMENTS

| | | | | |
|---|---|---|---|---|
| DE | 102016212645 A1 * | 1/2018 | .......... | G05D 1/0088 |
| WO | WO-2021174291 A1 * | 9/2021 | .......... | B64C 39/024 |

OTHER PUBLICATIONS

Murray, "Incorporating human factor considerations in UAV routing" (Year: 2013).*

Atyabi, "Autonomous mission planning" (Year: 2020).*

* cited by examiner

SYSTEMS AND METHODS FOR PRIORITIZED FIRE SUPPRESSION

TECHNICAL FIELD

The present disclosure relates generally to systems and methods of prioritizing fire suppression. More specifically, the present disclosure relates to a system and method of prioritizing fire suppression.

BACKGROUND

Optionally piloted, including completely autonomous, aircraft may fight fires more efficiently, safely, and timely when compared to manually determined firefighting approaches. Uninformed, subjective, or arbitrary firefighting approaches may result in less successful firefighting missions.

SUMMARY

During a firefighting mission, firefighter members are required to make decisions that may have serious and lasting consequences. The firefighting solution (or firefighting approach) determined by the firefighting members for the particular firefighting mission may be subjective, based on training, previous experiences, personal preferences, and in response to information currently available to the firefighting member, or other factors. However, firefighting members making these decisions may be limited in their decision making capacity based on their subjectivity and limited access to information.

Aspects of the present disclosure are directed to a prioritized fire suppression system that is configured to receive inputs from a firefighting mission and generate an optimized set of instructions based on user-prioritized firefighting factors. The prioritized fire suppression system may improve and/or optimize firefighting instructions using a centralized system that is configured to ingest information about the firefighting mission from various sources. The prioritized fire suppression system may consider user-prioritized firefighting factors when generating the optimal instructions(s) for the optimal firefighting approach specific to the particular firefighting mission. Firefighting factors that may be ingested by the system include population density, infrastructure value (financial value, public good value), water availability, quality of water, wind direction, fire temperature, hot spots, and refueling location distance, time to refuel, among others. The prioritization and optimization of multiple factors is continuously considered when planning and re-planning a firefighting mission based on the evolving firefighting mission and associated factors and prioritizations.

At last one embodiment relates to a system including for optimizing instructions directed to facilitating the completion of a mission in an evolving environment, comprising: one or more sensors mounted on a vehicle; a transceiver configured to transmit an instruction directed to facilitating the completion of the mission to an electronic display; and a server comprising a processor coupled to memory of the vehicle containing processor-readable instructions, the instructions causing the processor to: responsive to receiving a factor associated with the mission, compute the instruction directed to facilitating the completion of the mission based on optimizing a cost function, the factor being at least one of a boundary condition of the cost function or a constraint of the cost function.

The processor is further configured to receive a factor prioritization and compute the instruction directed to facilitating the completion of the mission based on optimizing the cost function being weighted by the factor prioritization. In some embodiments, the factor prioritization is received from at least one of a user input or from a machine learning model trained to predict the factor prioritization. In some embodiments, the factor prioritization comprises an evolved factor prioritization, the evolved factor prioritization being the factor prioritization at a later point in time.

The processor is further configured to optimize a plurality of cost functions and transmit a plurality of instructions based on each of the optimized cost functions to the electronic display. The processor is further configured to compute the instruction directed to facilitating the completion of the mission based on optimizing a chain of cost functions.

The received factor comprises an evolved factor, the evolved factor being the received factor at a later point in time. The one or more sensors are configured to continuously sense the evolving environment to capture the evolved factor.

The factor is received from at least one of a user input, data extracted from the one or more sensors, or the memory of the vehicle. The instructions directed to facilitating the completion of the mission instruct navigate the vehicle.

The processor is configured to receive multiple factor prioritizations and compute the instruction directed to facilitating the completion of the mission based on algorithmically combining multiple instructions directed to facilitating the completion of the mission, each of the multiple instructions directed to facilitating the completion of the mission based on optimizing the cost function with respect to a received factor prioritization of the received multiple factor prioritizations, wherein the algorithmic combination of the multiple instructions is based on the multiple factor prioritizations. In some embodiments, the processor is configured to compute a sequence of instructions directed to facilitating the completion of the mission.

An additional embodiments relates to a method for optimizing instructions directed to facilitating the completion of a mission in an evolving environment comprising: responsive to receiving, by a processor, a factor associated with a mission, computing the instruction directed to facilitating the completion of the mission based on optimizing a cost function, the factor being at least one of a boundary condition of the cost function or a constraint of the cost function; and transmitting, by the processor, to an electronic device, the instruction directed to facilitating the completion of the mission.

The method further comprises receiving a factor prioritization; and computing the instruction directed to facilitating the completion of the mission based on optimizing the cost function being weighted by the factor prioritization. The factor prioritization is received from at least one of a user input or from a machine learning model trained to predict the factor prioritization.

BRIEF DESCRIPTION OF THE DRAWINGS

The present disclosure will become more fully understood from the following detailed description, taken in conjunction with the accompanying figures, wherein like reference numerals refer to like elements, in which.

DETAILED DESCRIPTION

Figure 1:
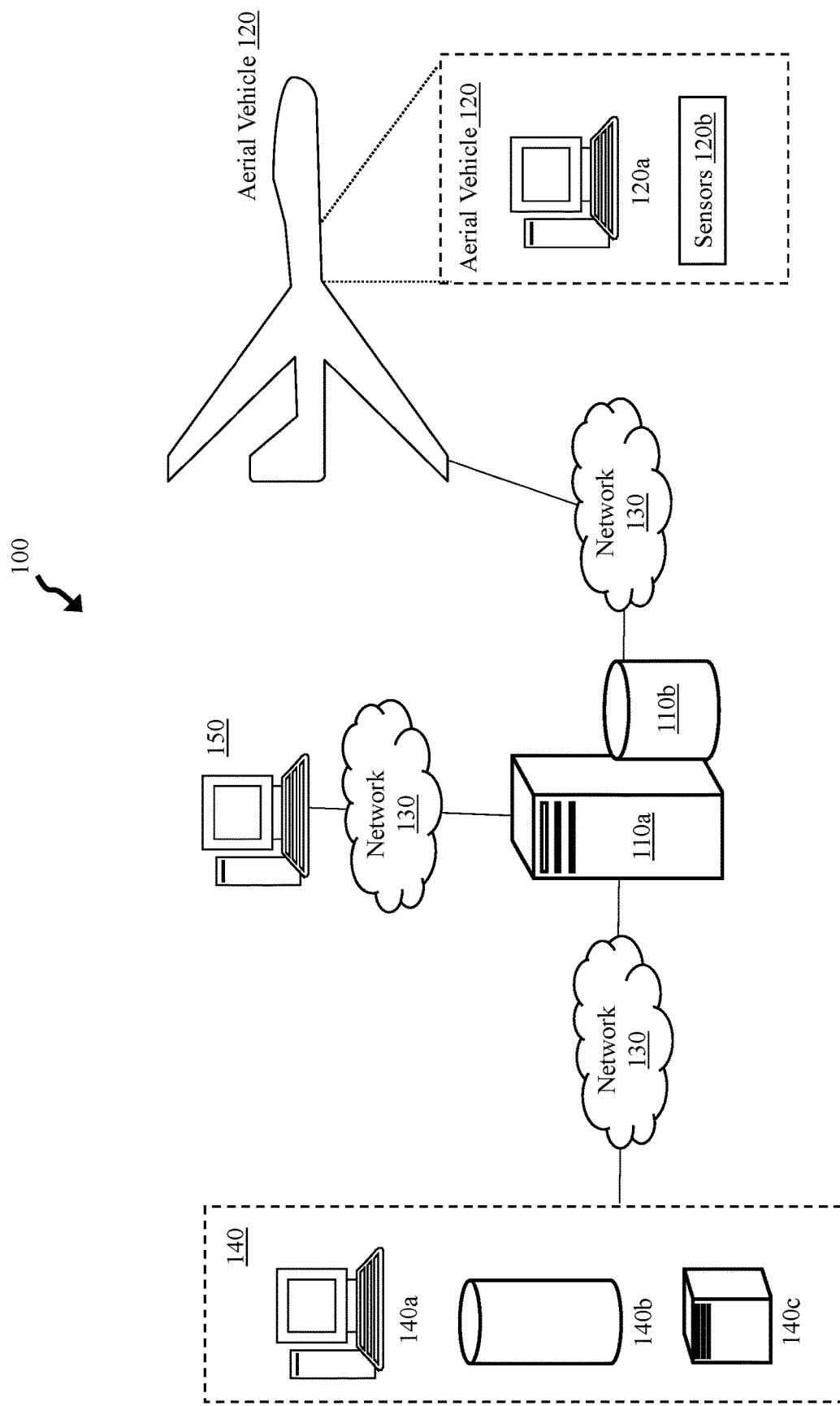
FIG. 1 is a block diagram illustrating components of a prioritized fire suppression system, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

A prioritized fire suppression system plans and re-plans one or more instructions of an optimal firefighting approach based on firefighting factors of the firefighting mission. Users, such as firefighting members, firefighting administrators, captains, chiefs, or other city personnel may rank (or prioritize, weigh) some factors (such as population density and infrastructure value) over other factors (such as refueling locations), for each particular firefighting mission. The ranked factors influence how the optimal firefighting approach is determined. One or more firefighting factors may be initialized in the prioritized fire suppression system at mission start, and may be updated throughout the firefighting mission as the mission evolves. The prioritized fire suppression system utilizes a cost function to determine instruction(s) that facilitate the most beneficial (and/or achievable) part of the fire to fight in a fire fighting mission. Accordingly, the cost function is constantly optimized in response to the evolving nature of the firefighting mission to determine the optimal instruction(s) to complete the firefighting mission.

The prioritized fire suppression system may contribute to greater firefighting mission success (defined by minimizing fire damage, injury, cost of repairs, and/or other cost functions) as compared to manual firefighting missions, as firefighting factors are identified, updated, and constantly re-evaluated systematically and in real-time (or near real time) during the firefighting mission. Accordingly, as the mission evolves, the firefighting approach also evolves but remains optimized, thus achieving one or more adaptive, optimized and improved firefighting instructions for the firefighting approach.

The systems, apparatuses, and methods described herein allow pilots, operators, decision makers, and other firefighting members to prioritize firefighting factors such that the prioritized fire suppression system can optimize a firefighting approach based on the factors.

The embodiments described herein are examples of systems and methods that reprioritize evolving firefighting factors to improve instructions in real time. For ease of description and understanding, the illustrative embodiments discussed herein mention employing such technology in the context of allowing users (e.g., pilots, fire captains, fire chiefs, firefighters, or other city personnel) to prioritize firefighting factors such that a prioritized fire suppression system can optimize instruction(s) for a firefighting approach. It should be appreciated that the technology is not limited to such implementations, and may be employed for any number of uses that may benefit from a continuously optimized (or improved) set of instructions based on evolving factors and associated factor rankings. For example, logistic systems, distribution systems, emergency systems (such as disaster relief) may benefit from a centralized analysis and reprioritization of evolving factors.

FIG. 1 is a block diagram illustrating components of a prioritized fire suppression system 100, according to an exemplary embodiment. The system 100 includes an analytics server 110a, an analytics database 110b, third party sources 140, a remote user device 150, and an aircraft 120. The aircraft 120 includes an onboard device 120a and sensors 120b. The system 100 is not confined to the components described herein and may include additional or other components, not shown for brevity, which are to be considered within the scope of the embodiments described herein.

The components of the system 100 may be coupled using intralink connections or interlink connections. For example, each of the third party sources 140 may be communicatively coupled with one another using a wired or wireless connection (e.g., intralink). Similarly, each of the components of the aircraft 120 may be communicatively coupled with one another using a wired or wireless connection. In addition, the above-mentioned components may be connected to each other through a network 130 (e.g., interlink). The communication over the network 130 may facilitate the communication of data to and from the aerial vehicle 120, the remote device 150, and/or the third party devices 140. The network 130 may be configured to support internet traffic, WiMAX traffic, or other types of traffic. The network 130 may include wired and/or wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The analytics server 110a may be any computing device comprising a processor and non-transitory machine-readable storage capable of executing the various tasks and processes described herein. The analytics server 110a may employ various processors such as central processing units (CPU) and graphics processing unit (GPU), among others. While the analytics server 110a is shown as an independent component of the system 100, the operations and/or functionality of the analytics server 110a may be integrated into, downloaded on, or accessed using any other component device component in the system 100. For example, FIG. 1 shows the analytics server 110a as a distinct computing device from the remote user device 150, the onboard device 120a of the aerial vehicle 120, and the third party user device 140a. However, in some configurations, the analytics server 110a may be integrated into the remote user device 150, the onboard device 120a and/or the third party user device 140a (or some combination) such that the operations performed by the analytics server 110a are performed by one or more other devices. Alternatively, the analytics server 110a may be implemented in or accessibly by a separate computing device that may be physically loaded onto the aerial vehicle 120 or stationed next to the remote user device 150 and/or the third party sources 140. While the system 100 in FIG. 1 illustrates a single analytics server 110a, the analytics server 110a may include any number of computing devices operating in a distributed computing environment, such as a cloud environment.

In operation, the analytics server 110a may iteratively receive factor data from a user, retrieve such data from a data repository and/or extract factor data from sensors 120b, analyze the data, and display the results on the electronic platform until the firefighting mission is completed. The analytics server 110a may execute various algorithms and/or models (stored within the analytics database 110b) to analyze the received data to generate optimized instruction(s) to facilitate a successful completion of the firefighting mission.

The analytics server 110a may generate and display an electronic platform configured to use various algorithms and/or models to recommend one or more instructions for an adaptive firefighting approach. More specifically, the analytics server 110a may generate and display the firefighting approach including one or more instructions directed to suppress an active fire associated with a firefighting mission. The firefighting approach may include one instruction or a set of instructions used to successfully suppress a fire of the firefighting mission and result in the completion of the firefighting mission. For example, instructions may include instructions configured to navigate the aerial vehicle 120 to a coordinate location, instructions configured to execute an action (e.g., release a fire suppressant over an area), instructions configured to land the aerial vehicle 120, and the like. The analytics server 110a displays the optimal firefighting approach to one or more users.

The analytics server 110a may communicate instructions such as firefighting approach instructions and/or navigation instructions and prioritized factors, as discussed further herein, to/from one or more devices (e.g., the aerial vehicle 120, remote user device 150, and/or third party user device 140a). The aerial vehicle 120 may receive instructions from the analytics server 110a and display the tasks in a sequence or one individual task at a time, using the onboard device 120a. The analytics server 110a may also display the instructions to the remote user device 150, and/or the third party user device 140a. In some embodiments, the instructions displayed (and/or the number of tasks displayed) may vary based on user privileges. While the analytics server 110a is generating and displaying instruction(s) to the users, the analytics server 110a can currently revise the instruction(s) based on evolving factors.

The analytics server 110a may be in communication (real-time or near real time) with the remote user device 150 such that an operator operating the remote user device 150 can accept, reject and/or modify one or more instructions. The analytics server 110a may also be in communication (real-time or near-real time) with the onboard user device 120a such that a pilot operating the aerial vehicle 120 (if the aerial vehicle 120 is not fully automated) has time to respond to one or more instructions (e.g., turn around, execute a fire suppression action, call firefighting units to a particular area). The analytics server 110a may also be in communication (real-time or near-real time) with the third party user device 140a such that a third party operator has time to respond to one or more instructions of the firefighting approach (e.g., call for a rescue crew, deploy more firefighting troops, input other factors about the particular area under fire).

In other embodiments, firefighting units may utilize a wearable device (e.g., earpiece, glasses, watch, wrist computer) configured to receive instructions and/or notifications from the analytics server 110a. The instructions may be communicated to the user wearing the wearable device audibly, via a screen, according to haptic feedback, and the like. In other embodiments, the aerial vehicle 120 receives instructions and/or notifications from the analytics server 110a and transmits the instructions and/or notifications to third party devices. In other embodiments, the analytics server 110a may be configured to execute instructions without user intervention. For example, the analytics server 110a may be configured to navigate the aerial vehicle 120 without user intervention.

The electronic platform may include graphical user interfaces (GUIs) displayed on the remote user device 150. An example of the electronic platform generated and hosted by the analytics server 110 may be a web-based application or a website configured to be displayed on different electronic devices such as mobile devices, tablets, personal computers, and the like.

The analytics server 110a may host a website accessible to users operating any of the electronic devices described herein (e.g., users operating an onboard device 120a of the aerial vehicle, users operating the remote device 150, and/or third party users operating third party user device 140a). The analytics server 110a may execute software applications configured to display the electronic platform (e.g., host a website), which may generate and serve various webpages to each of the electronic devices described herein. Different users at each of the electronic devices may use the website to view and/or interact with (e.g., prioritize) the firefighting factors affecting the evolving firefighting mission.

The analytics server 110a may be configured to require user authentication based upon a set of user authorization credentials (e.g., username, password, biometrics, cryptographic certificate, and the like). The analytics server 110a may access the analytics database 110b configured to store user credentials, which the analytics server 110a may be configured to reference in order to determine whether a set of entered credentials (purportedly authenticating the user) match an appropriate set of credentials that identify and authenticate the user. For example, the analytics database 110b may contain a lookup table matching user authentication information (e.g., name, home address, IP address, MAC address, phone number, biometric data, passwords, username) to user identities.

In some embodiments, the analytics server 110a may match user identities to a user's role. A user's role be defined by data fields and input fields in user records stored in the analytics database 110b. The analytics server 110a may authenticate the user and may identify the user's role by executing an access directory protocol (e.g., lightweight directory access protocol). Different user roles may be associated with different user privileges. For example, a subset of users with a particular user role may be allowed to interact with an interactive map displayed by the analytics server 110a, prioritize factors, and/or issue instructions to the aerial vehicle 120. If a user who is not authorized attempts to perform an authorized action (e.g., interact with the interactive map), the analytics server 110a may not process the action (e.g., ignore the action) such that the user's interaction with the interactive map is not recognized. Further, the analytics server 110a may use user roles to display different information to users. For instance, the analytics server 110*a* may display a portion of an interactive map generated by the analytics server 110*a* to particular users limited by their user role.

In some embodiments, the analytics server 110*a* may also be configured to encrypt or decrypt data transmitted to, and received from, the network 130. For example, the analytics server 110 may include cryptography instructions configured to establish a secure communication session (e.g., using the IPSec protocol or similar) in which data communicated over the session is encrypted and securely transmitted. In this regard, factor data, firefighting approach instructions, (or other types of data) may be encrypted and transmitted to prevent or substantially prevent the threat of hacking or unwanted sharing of information.

The analytics server 110*a* determines an optimal (or improved) firefighting approach including one or more instructions (or a sequence of instructions, a set of instructions) for fighting fire based on optimizing a cost function. As discussed herein, various firefighting factors identified during a firefighting mission dictate constraints of the cost function, the bounds of the cost function, the priorities of the optimization of the cost function, and the like. The analytics server 110*a* may receive factors from users (e.g., users using a remote device 150, users using the onboard device 120*a*, and/or user using the third party user device 140*a*), from sensor data collected from sensors 120*b*, and/or from databases.

Receiving a firefighting factor includes receiving an indication of the presence (or absence) of the factor in the current firefighting mission and any associated quantitative or qualitative data/information. In some embodiments, the analytics server 110*a* may extract factor data from sensors 120*b*. For example, flame front data, structure data (e.g., buildings, bridges, towers, etc.), hot spot data, road data, vehicle data (e.g., ground, water, or other aerial vehicles), weather features (e.g., clouds, smoke plumes, smoke patterns, etc.), or people data (e.g., a number of people identified in a particular area of a firefighting mission), may be extracted from the sensors 120*b*.

In other embodiments, the analytics server 110*a* may communicate (in real-time or near real time) with one or more users (e.g., a user operating the remote user device 150, a user operating the onboard device 120*a* on the aerial vehicle 120, and/or a user operating a third party user device 140*a*) such that the analytics server 110*a* may receive factors (and factor prioritizations) from users. For example, users may select factors and input factor information (e.g., using predetermined factor information fields, text entry boxes, drop down menus, keyboards, touch entries, voice commands, mouse clicks). In other embodiments, users may select factors and input factor information using an interactive map generated and displayed by the analytics server 110*a*.

In some embodiments, the interactive map may be a collection of sensor information extracted from sensors 120*b* that models an environment. The modeled environment may be the environment surrounding the aerial vehicle 120 and/or other environment. In some embodiments, the analytics server 110*a* may generate the interactive map in real time based on sensor information. In other embodiments, the analytics server 110*a* may retrieve a previously generated interactive map. The interactive map may include height maps, temperature maps, red-green-blue (RGB) channels, (e.g., from visible light cameras), terrain information, weather information, or visibility information, among any other type of sensor data. The interactive map may be iteratively updated as additional sensor information is captured and processed by sensors 120*b* and/or the analytics server 110*a*. The interactive map may also be updated according to user inputs received from the remote user device 150, a pilot on the aerial vehicle 120 using the onboard device 120*a*, and/or user input received from third party user device 140*a*. In some embodiments, the analytics server 110*a* may use the interactive map to perform one or more automated navigational tasks.

The interactive map may be populated with information about the area under fire (e.g., the geographical layout, the altitude, landmarks, or structures, or any combination thereof). The analytics server 110*a* may store the sensor information in association with one or more timestamps corresponding to when the sensor information was received as part of the interactive map. The analytics server 110*a* may also store the sensor information in association with one or more timestamps in the analytics database 110*b*. In some embodiments, the analytics server 110*a* may process the sensor information captured from the sensors 120*b* before updating the interactive map. For example, the analytics server 110*a* may be configured to generate a time derivative of heat maps indicating a direction of a flame path. In some embodiments, the analytics server 110*a* may overlay various factors and associated factor rankings/prioritizations on the interactive map.

In some embodiments, the analytics server 110*a* may generate and display the map based on a user's role within the system. For example, the analytics server 110*a* may generate map content and/or allow user interactions with the map according to the user's role and privileges defined by the user record in the analytics database 110*b*. In an illustrative example, third parties may not have permission to interact with the interactive map and only view the map. Accordingly, the analytics server 110*a* may limit the displayed information and/or interaction privileges of third parties.

A user, after being authorized by the analytics server 110*a* in some cases, may interact with the interactive map to rank (or prioritize) areas of the map and/or factors indicated on the map. For example, a user (e.g., a user operating the remote user device 150, a user operating the onboard device 120*a* on the aerial vehicle 120, and/or a user operating a third party user device 140*a*) may re-prioritize a factor by interacting with a slider bar associated with the factor (e.g., sliding the factor to be "more prioritized" or "less prioritized"), entering qualitative and/or quantitative prioritization information into an interactive box (e.g., a text box), selecting a priority using a scale (e.g., a Likert scale), and the like. The analytics server 110*a* optimizes a firefighting approach in response to the prioritized factor(s). In some embodiments, when a third party user using the third party user device 140*a* has prioritized one or more factors, the analytics server 110*a* may transmit a notification to a user using the remote device 150 (and/or pilot(s) using the onboard device 120*a*). The user using the remote user device 150 (and/or pilot(s) using the onboard device 120*a*) may approve, reject and/or modify the factors prioritized by the user using the third party device 140*a*.

In some embodiments, the analytics server 110*a* may receive factors (and rankings) from users audibly. For example, the analytics server 110*a* initiate a communication session between the third party user operating the third party user device 140*a*, a user using the onboard device 120*a* and/or a user using the remote device 150. The analytics server 110*a* may analyze audio data communicated between the users during the communication session. For example, the analytics server 110a may parse communicated audio signals into audio frames containing portions of audio data. The frames may be portions or segments of the audio signal having a fixed length across the time series, where the length of the frames may be pre-established or dynamically determined.

The analytics server 110a may also transform the audio data into a different representation during processing. The analytics server 110a initially generates and represents the audio signal and frames (and optionally sub-frames) according to a time domain. During processing, the analytics server 110a may transform the frames (initially in the time domain) to a frequency domain or spectrogram representation. The spectrogram representation represents the energy associated with the frequency components of the audio signal in each of the frames, thereby generating a transformed representation. In some implementations, the analytics server 110a executes a Fast-Fourier Transform (FFT) operation of the frames to transform the audio data in the time domain to the frequency domain. For each frame (or sub-frame), the analytics server 110a may perform a simple scaling operation so that the frame occupies the range a predetermined range of measurable energy.

In some implementations, the analytics server 110a may employ a scaling function to accentuate aspects of the speech spectrum (e.g., spectrogram representation). The speech spectrum, and in particular the voiced speech, will decay at higher frequencies. The scaling function beneficially accentuates the voiced speech such that the voice speech is differentiated from background noise in the audio signal. The analytics server 110a may perform an exponentiation operation on the array resulting from the FFT transformation. The analytics server 110a may employ automatic speech recognition and/or natural language processing algorithms to interpret the audio signal and extract factors from the communication session between the users.

In other embodiments, the analytics server 110a may retrieve factors from one or more data sources (such as factors from third party database 140c and/or historic factors from the analytics database 110b). For example, the analytics server 110a may query the third party database 140b for firefighting factors about a particular area. In some embodiments, the analytics server 110a communicates the retrieved factors to the one or more users (e.g., a user operating the remote user device 150, a user operating the onboard device 120a on the aerial vehicle 120, and/or a user operating a third party user device 140a).

As described herein, factors captured by sensors 120b may include wind speed data, wind direction data, water availability, detected flame fronts, temperature of the flames, and the like, Sensors 120b may capture streams of video data. The analytics server 110a may employ one or more object detection and/or object recognition algorithms (e.g., You Only Look Once, Simple Online Real Tracking, convolutional neural networks trained to classify objects in an image) to extract factors from the sensor data.

As described herein, the analytics server 110a determines the firefighting approach based on the firefighting factors describing (quantifying) characteristics of the firefighting mission. Factors may also be prioritized (ranked, weighted, biased, encouraged, or discouraged) to further optimize the determined firefighting approach given the particular firefighting mission. The more factors and associated prioritizations that are considered by the analytics server 110a, the more the firefighting approach may be optimal for the particular firefighting mission.

Factors and/or factor rankings may be quantitative data and/or qualitative data. In some embodiments, the analytics server 110a may convert (or otherwise transform) qualitative data to quantitative data to use the factor information and/or factor rankings in optimization algorithms/models.

In some embodiments, the analytics server 110a may receive prioritizations regarding each factor determined by one or more users (e.g., users using the remote user device 150, users using the onboard device 120 of the aerial vehicle 120, and/or users using the third party user device 140a) or a combination of one or more users (e.g., an average of user rankings). If the analytics server 110a identifies a factor without a prioritization, the analytics server 110a may transmit a notification to one or more users to prioritize the factor. In some embodiments, the analytics server 110a retrieves historic factor prioritizations from the analytics database 110b and applies the historic factor prioritizations to the current firefighting mission. In some embodiments, the analytics server 110a may transmit a notification to one or more users informing the one or more users of the application of the historic factor prioritization to the current mission. In some embodiments, factor prioritizations can be randomly initialized. In other embodiments, factors may be prioritized equally until a user with privileges adjusts the factor prioritizations. In yet other embodiments, the analytics server 110a may predict how a user would prioritize the factors.

Figure 2:
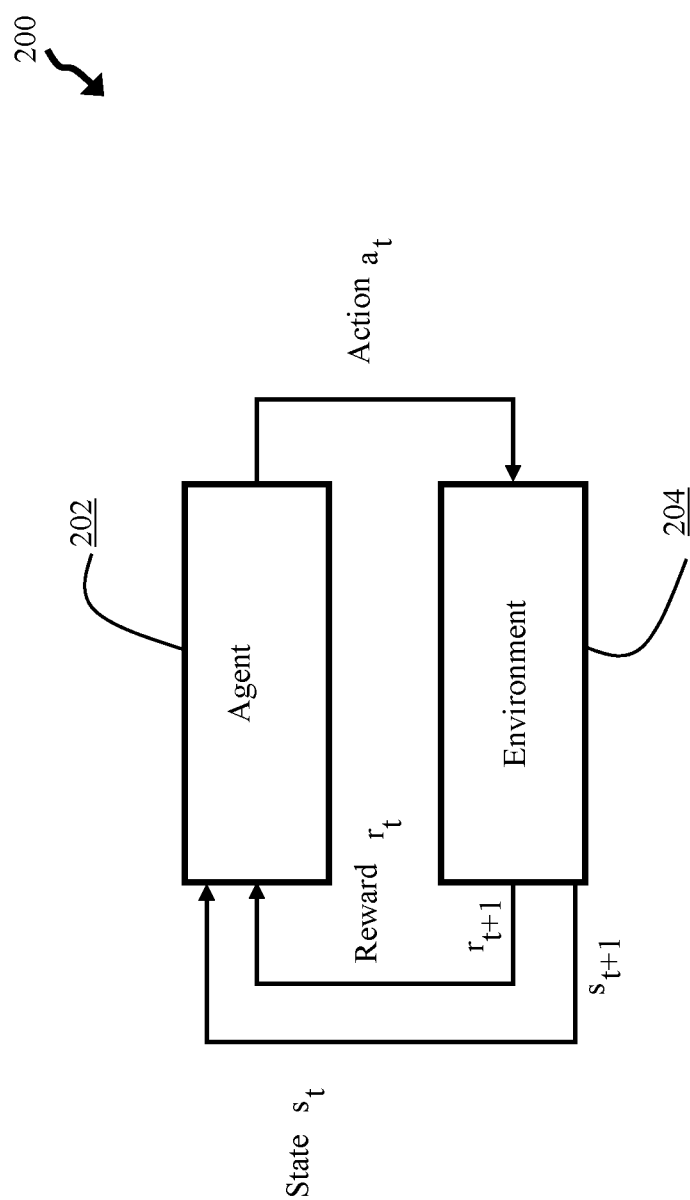
FIG. 2 is a simplified reinforcement learning model, according to an exemplary embodiment.

Referring now to FIG. 2, a simplified reinforcement learning model 200 is shown, according to an exemplary embodiment. The simplified reinforcement learning model may be used to select a factor prioritization given the factors of the firefighting mission. Reinforcement learning is a method of training a machine learning model using agents selecting actions to maximize rewards based on a policy. The analytics server 110a may be configured to execute one or more reinforcement learning models.

In reinforcement learning, an agent 202 interacts with an environment 204 to train a policy that is used to select factor prioritizations given the factors (or the current state) of the firefighting mission. As used herein, the "agent" 202 refers to an algorithm (e.g., formula, process, etc.) that is executed by the analytics server 110a to learn or train a policy directed to selecting an action (e.g., a factor prioritization). Asynchronous advantage actor critic reinforcement learning is an example of reinforcement learning that may be performed to instantiate multiple learning agents 202 in parallel. The agents 202, as described herein, learn to select factor prioritizations based on the policy trained over time. Each agent 202 asynchronously performs actions and calculates or determines rewards using a single machine learning model (such as a deep neural network) and/or a global model.

In one embodiment, the environment 204 refers to the state of firefighting mission. At each time step/(e.g., each iteration), the agent 202 observes a state $s_t$ of the environment 204 and selects an action from a set of actions. The possible set of actions (e.g., action space) for a reinforcement learning model may be arbitrarily defined and depend on the solution space considerations. For example, the solution space may be discretized such that the possible factor prioritizations are at fixed intervals rather than on a continuous range. For example, the action space may include actions such as "set factor ranking to +1", "set factor ranking to −0.3", and the like. In other examples, the solution space may be continuous rather than discrete. For example, the action space may include such actions as "increase factor ranking." In the event that a continuous solution space is implemented, the agents 202 may need to train for a longer duration of time such that the agents 202 can determine, for example, how much to modify (e.g., increase or decrease) the factor prioritization.

The agents 202 may select an action (e.g., a prioritization of a factor) based on, in part, the policy that is trained using the value of selecting each action, where the value of selecting the action is defined as the expected reward received when taking that action from the possible set of actions. The policy may be a global policy such that the agents 202 share a common policy and/or a policy specific to a particular agent 202. Using a global policy allows each agent 202 to have a diversified training dataset and reduces the need for the synchronization of models associated with each agent 202. In some embodiments, the analytics server 110a may update the policy using agents operating in other servers (e.g., via federated learning).

One goal of reinforcement learning is to determine a policy that maximizes the cumulative set of rewards, determined via a reward function. Each iteration (or after multiple iterations and/or steps), the agent 202 learns to perform better as can be seen in the increase of the rewards (e.g., an iterative summation of rewards). The agent 202 learns (e.g., reconfigures its policy) by taking actions and analyzing the rewards received in response to the changed environment 204.

In some configurations, the agent 202 determines the rewards responsive to the agent 202 actions. In other configurations, the analytics server 110a may provide rewards to an agent 202. In response to selecting an action (or multiple actions), the agent 202 may receive rewards and/or determine rewards, indicating how the action affected the environment 204.

Each iteration (or after multiple iterations and/or steps), the environment 204 may change, and there may be a new firefighting mission state, new factors and/or new factor prioritizations (e.g., a new state $s_{t+1}$). The analytics server 110a may determine a reward based on monitoring the inputs of users in response to the changed environment. In some embodiments, the reward may be binary (e.g., no reward or reward). In response to the user approving (or not changing) the prioritization determined by the agents 202, the agents 202 may receive a reward. In contrast, if the user does change the prioritization in response to the factor prioritization determined by the agents, then the agents 202 may not receive a reward.

The analytics server 110a may also calculate the reward using a reward function. A reward function can include, for example, functions based on the observed state $R(s_t)$, functions based on the observed state and the action taken by the agent, $R(s_t, a_t)$, and functions taken based on the observed state, an action, and a next state $R(s_t, a_t, s_{t+1})$. The reward may also be defined by other functions such as a prioritization selection goodness function, which may include various quadratic terms based on, in part, factors determined by a user when prioritizing other factors. In other embodiments, the reward function may include the root mean square error function, the square error function, the absolute error function, and the like.

For example, the rewards at each iteration (or multiple iterations) may be compared to a baseline. The baseline may be an expected performance. For instance, the baseline may be a historic factor prioritization score associated with a factor prioritization of a historic firefighting mission, an average historic factor prioritization associated with several historic factor prioritizations of several historic firefighting missions, and the like. Evaluating the difference between the baseline and the reward may be considered evaluating a value of advantage (e.g., advantage value). The value of the advantage indicates how much better the reward is from the baseline (e.g., instead of an indication of which rewarded actions and non-rewarded actions).

Agents 202 may also select actions based on, in part, exploratory actions and exploitation actions. An exploratory action improves an agent's knowledge about an action by using the explored action in a sequence resulting in a reward calculation. An exploratory action is an action unrestricted by prior knowledge. An exploitation action is a "greedy" action that exploits the agent's 202 current action-value estimates. For example, when the epsilon indicates the exploration action, the policy may direct the agent 202 to select a random action. In contrast, when the epsilon indicates the exploitation action, the policy may direct the agent 202 to select an action that has previously received a reward given one or more similar factors and/or factor prioritizations present in a firefighting mission.

Using epsilon-greedy action selection, for example, the agent 202 balances exploratory actions and exploitation actions. The agent 202 may select an epsilon value and perform an exploitation action or an exploratory action based on the value of the epsilon and one or more exploitation and/or exploration thresholds. The agent 202 may randomly select an epsilon value, select an epsilon value from a predetermined distribution of epsilon values, select an epsilon value in response to the environment 204, select an epsilon value in response to one or more criteria, select an epsilon value in response to the number of training epochs, select an epsilon value in response to one or more gradients, and the like.

The agent 202 selects a next action based on the current state $s_t$ (e.g., the state of the firefighting mission, the state of other factors), the epsilon value, and the policy. In some embodiments, as training progresses, exploitation actions may be leveraged to refine training the experts. For example, the analytics server 110a may revise the epsilon value (or epsilon selection method) such that the likelihood of the exploration action is higher or lower than the likelihood of the exploitation action. Additionally, or alternatively, the analytics server 110a may revise the exploitation action threshold and/or the exploration action threshold.

The agents 202 of the machine learning model may continue training the policy until a predetermined threshold has been satisfied. For instance, the analytics server may train the policy until the advantage value is within a predetermined accuracy threshold. The policy may also be trained until a predetermined number of steps (or series of steps called episodes, or iterations) have been reached.

Once trained and validated, the agents 202 may be employed during testing (or an inference phase). During testing, the analytics server 110a (and in particular, the agents 202) may ingest unknown data to select factor prioritizations to be associated with factors during the firefighting mission (until the factors evolve, the firefighting mission is terminated, a user adjusts the factor prioritization, and/or one or more instructions of the firefighting approach are completed).

Figure 3:
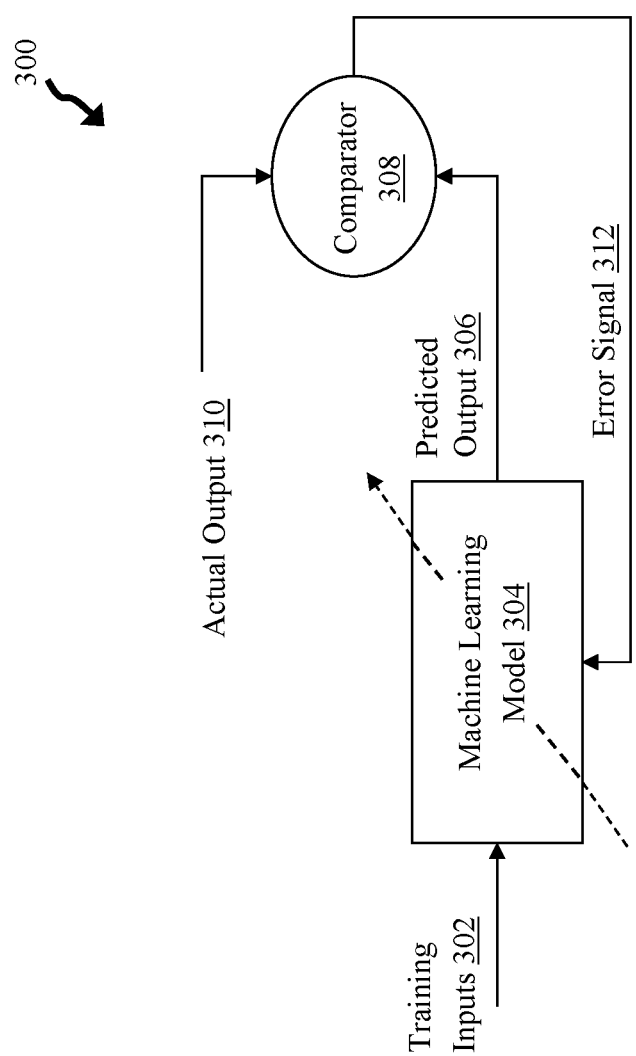
FIG. 3 is a block diagram of a supervised learning system, according to an exemplary embodiment.

Referring now to FIG. 3, a block diagram of a supervised learning system 300 is shown, according to an exemplary embodiment. Supervised learning is a method of training a machine learning model given input-output pairs. In some embodiments, the analytics server 110a uses supervised learning to train machine learning models to predict a factor prioritization given other factors and/or factor prioritizations.

An input-output pair is an input with an associated known output (e.g., an expected output). Machine learning model 304 may be trained on known input-output pairs (e.g., a target historic factor and associated target historic factor prioritization) such that the machine learning model 304 can learn how to predict known outputs given known inputs. Once a machine learning model 304 has learned how to predict known input-output pairs, the machine learning model 304 can operate on unknown inputs to predict an output.

The analytics server 110a may employ one or more trained machine learning models 304 to select a factor prioritization (e.g., an unknown output) given unknown inputs (e.g., firefighting factors and/or associated prioritizations of a current firefighting mission). To train the machine learning models to generate a target factor prioritization using supervised learning, training inputs 302 and actual outputs 310 may be provided to the machine learning model 304. Training inputs 302 may include historic factors and associated historic factor prioritizations of a given historic firefighting mission, including a target historic factor of the given historic firefighting mission. Actual outputs 310 may include a user determined target factor prioritization associated with the target factor. The training inputs 302 and actual outputs 310 may be retrieved from one or more data repositories (e.g., analytics database 110a, analytics server 110a memory, third party database 110c).

In an example, a machine learning model 304 may use the training inputs 302 (e.g., a target historic factor in a particular firefighting mission and other historic factors/historic factor prioritizations in the particular firefighting mission), to predict outputs 306 (e.g., a target historic factor prioritization associated with the target historic factor in the particular firefighting mission) by applying the current state of the machine learning model 304 to the training inputs 302. The comparator 308 may compare the predicted outputs 306 to the actual outputs 310 (e.g., a user determined target historic factor prioritization associated with the target historic factor in the particular firefighting mission) to determine an amount of error or differences.

Generally, machine learning models are configured to learn the dependencies between various inputs. Accordingly, training the machine learning model 304 with other factors (e.g., factors and associated factor prioritizations not including the target factor and target factor prioritization) allows the machine learning model 304 to learn, and benefit from, the interplay between the factors. For example, training the machine learning model to predict a target factor prioritization given other factors and associated prioritizations may result in improved accuracy of the predicted target factor prioritization from factor prioritization predicts that may be determined individually and/or independently.

In other embodiments, the machine learning model 304 may be trained to predict a factor prioritization without other factors and associated factor prioritizations. For example, the model 304 may be trained using the training inputs 302 (e.g., a historic factor) to predict output 206 (e.g., the historic factor prioritization) by applying the current state of the machine learning model 304 to the training inputs. The comparator 308 may compare the predicted outputs 306 to the actual output 310 (e.g., a user determined historic factor prioritization) to determine an amount of error or differences.

The error (represented by error signal 312) determined by the comparator 308 may be used to adjust the weights in the machine learning model 304 such that the machine learning model 304 changes (or learns) over time to generate a relatively accurate factor prioritization given different firefighting missions using the input-output pairs. The machine learning model 304 may be trained using the backpropagation algorithm, for instance. The backpropagation algorithm operates by propagating the error signal 312. The error signal 312 may be calculated each iteration (e.g., each pair of training inputs 302 and associated actual outputs 310), batch, and/or epoch and propagated through all of the algorithmic weights in the machine learning model 304 such that the algorithmic weights adapt based on the amount of error. The error is minimized using a loss function. Non-limiting examples of loss functions may include the square error function, the room mean square error function, and/or the cross entropy error function.

The weighting coefficients of the machine learning model 304 may be tuned to reduce the amount of error thereby minimizing the differences between (or otherwise converging) the predicted output 306 and the actual output 310 such that the predicted factor prioritization is similar to a user determined factor prioritization. The machine learning model 304 may be trained until the error determined at the comparator 308 is within a certain threshold (or a threshold number of batches, epochs, or iterations have been reached). The trained machine learning model 304 and associated weighting coefficients may subsequently be stored in a data repository (e.g., analytics database 110b, memory of the analytics server 110a) such that the machine learning model 304 may be employed on unknown data (e.g., not training inputs 302). Once trained and validated, the machine learning model 304 may be employed during testing (or an inference phase). During testing, the machine learning model 304 may ingest unknown data to predict factor prioritizations.

Figure 4:
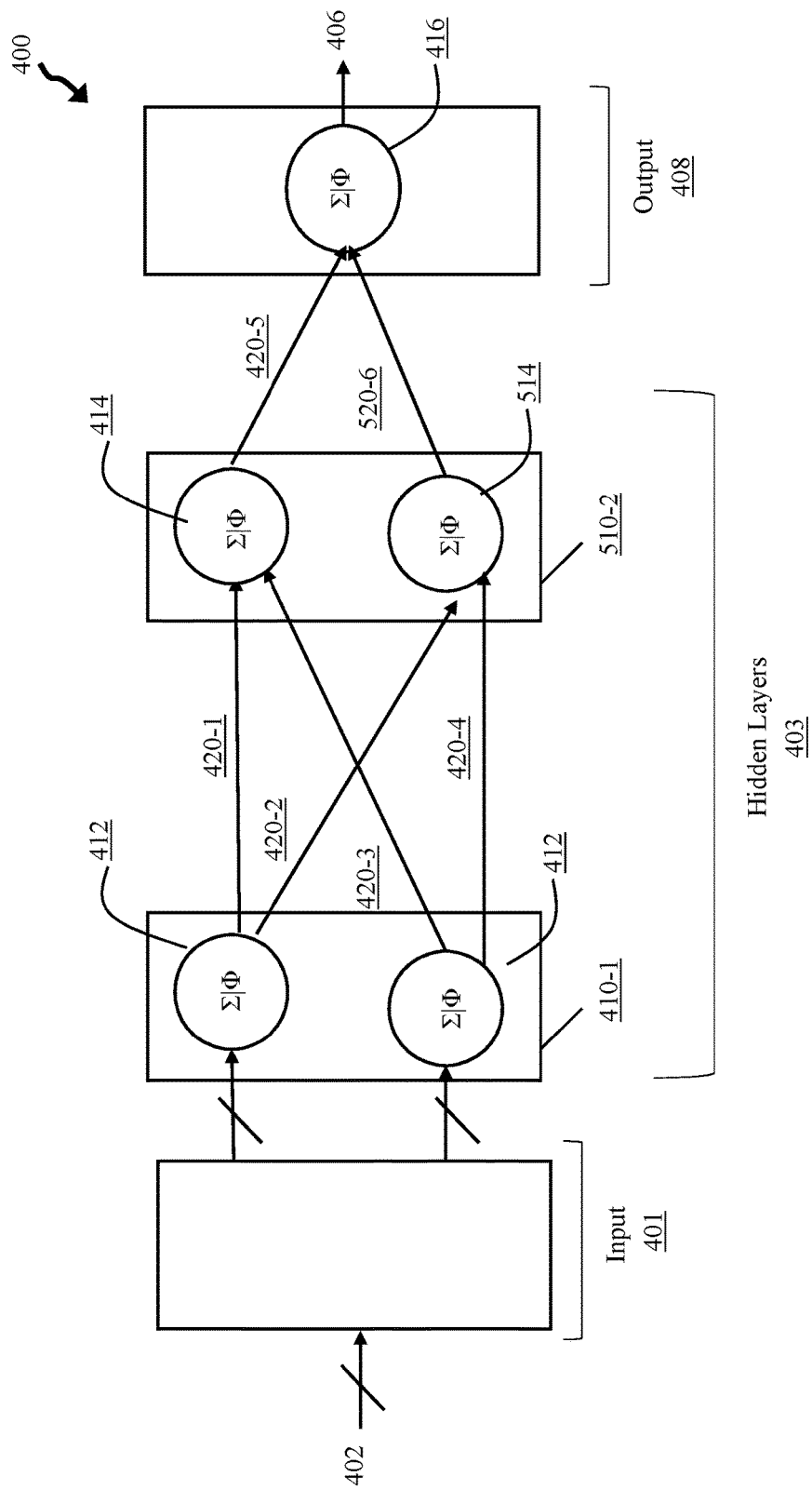
FIG. 4 is a block diagram of a simplified neural network model, according to an exemplary embodiment.

Referring next to FIG. 4, a block diagram of a simplified neural network model 400 is shown, according to an exemplary embodiment. The analytics server 110a may be configured to execute various neural networks(s) trained to predict a factor prioritization given a factor and/or other factors and associated prioritizations. For example, convolutional neural networks, recurrent neural networks, gated neural networks, and the like may be employed to predict a factor prioritization. The neural network model 400 may be trained using supervised learning, as discussed with reference to FIG. 3. The neural network model 400 may include a stack of distinct layers (vertically oriented) that transform a variable number of inputs 402 being ingested by an input layer 404, into an output 406 at the output layer 408.

The neural network model 400 may include a number of hidden layers 410 between the input layer 404 and output layer 408. Each hidden layer has a respective number of nodes (412, 414 and 416). In the neural network model 400, the first hidden layer 410-1 has nodes 412, and the second hidden layer 410-2 has nodes 414. The nodes 412 and 414 perform a particular computation and are interconnected to the nodes of adjacent layers (e.g., nodes 412 in the first hidden layer 410-1 are connected to nodes 414 in a second hidden layer 410-2, and nodes 414 in the second hidden layer 410-2 are connected to nodes 416 in the output layer 408). Each of the nodes (412, 414 and 416) sum up the values from adjacent nodes and apply an activation function, allowing the neural network model 400 to detect nonlinear patterns in the inputs 402. Each of the nodes (412, 414 and 416) are interconnected by weights 420-1, 420-2, 420-3, 420-4, 420-5, 420-6 (collectively referred to as weights 420). Weights 420 are tuned during training to adjust the strength of the node. The adjustment of the strength of the node facilitates the neural network's ability to predict an accurate output 406.

The analytics server 110*a* optimizes (improves, or generates) the firefighting approach for a particular firefighting mission by optimizing cost function(s). The cost function may be defined as the cost of the fire (e.g., structure damage, human injury), functions that define the duration of the firefighting mission or other functions that may be defined to quantify the success of a firefighting mission. Accordingly, when the analytics server minimizes the cost function, the analytics server minimizes the cost of the fire and/or the duration of the firefighting mission. When optimizing the cost function, the firefighting factors (and the associated rankings/prioritizations) may become constraints to a multi-constraint optimization problem. For example, factors that may be configured into constraints include a number of available firefighting units, the amount of available water, and the like.

In other embodiments, the firefighting factors (and associated rankings/prioritizations) may become bounds (or tolerances). The bounds associated with each factor may be predetermined (e.g., by a user) and may vary depending on the factor. For example, a boundary associated with a wind speed factor may be +10% of the wind speed factor. A boundary associated with a population density factor may be +25% of the population density factor. The analytics server 110*a* optimizes the cost function given the system bounds. However, if a factor is subsequently determined to be outside of the bounds that were used when the analytics server 110*a* optimized the cost function (based on receiving sensor data from sensors 120*b* on the aerial vehicle 120 for instance), the firefighting approach associated with the previously optimized cost function may not be an optimal solution anymore because the bounds of the system have been modified. Accordingly, the analytics server 110*a* may re-optimize the cost function given new system bounds to determine a revised optimal firefighting approach.

In some embodiments, the analytics server 110*a* may minimize multiple cost functions using multiple factors. For example, a first cost function may be directed to minimizing structural damage to a first structure or building. A second cost function may be directed to minimizing the structural damage to a second building. A third cost function may be directed to minimizing human injury during the firefighting mission. The analytics server 110*a* optimizes each of the cost functions individually and then algorithmically combines the results of the optimized multiple cost functions. If the factors were prioritized, the analytics server 110*a* may weigh the solutions to each of the cost functions according to the prioritizations of the factors. For example, a user may have determined to prioritize minimizing the structural damage of the first building over minimizing the structure damage of the second building (e.g., using quantitative prioritizations and/or qualitative prioritizations). Accordingly, the solutions determined by the analytics server 110*a* when optimizing the cost function with respect to the structural damage to the first structure may be weighted more than the solutions determined by the analytics server 110*a* when optimizing the cost function with respect to the structural damage to the second building. Decision variables (e.g., the solution space) that are optimized according to the cost function may be the optimal instructions (or sequences of instructions) determined by the analytics server 110*a*. The solution space may be arbitrarily defined and depend on predefined solution space considerations. For example, the solution space may be discretized such that the decision variables are fixed. For example, discrete decision variables may include "turn left", "drop water", "drop fire retardant," "turn right", "collect water", "stay straight", "land", etc. The solution space may also include more complex schemes such as multiple decision variables in a sequence such as "turn left and land."

In other embodiments, the solution space may be continuous rather than discrete. For example, the decision variables in the solution space may include "turn a direction", "do not turn", etc. In the event that a continuous solution space is implemented, it may take the analytics server 110*a* longer to converge to an optimal solution.

The analytics server 110*a* may execute different optimization techniques to solve the optimization problem because different optimization techniques have different strengths and weaknesses. In some embodiments, mapping theory may be performed to approximate decision variables, reducing the computational cost of optimizing high-fidelity cost functions by mapping high-fidelity cost functions to low-fidelity coarse cost functions. The low-fidelity cost function may be optimized to approximate optimizing the high-fidelity cost function.

Figure 5:
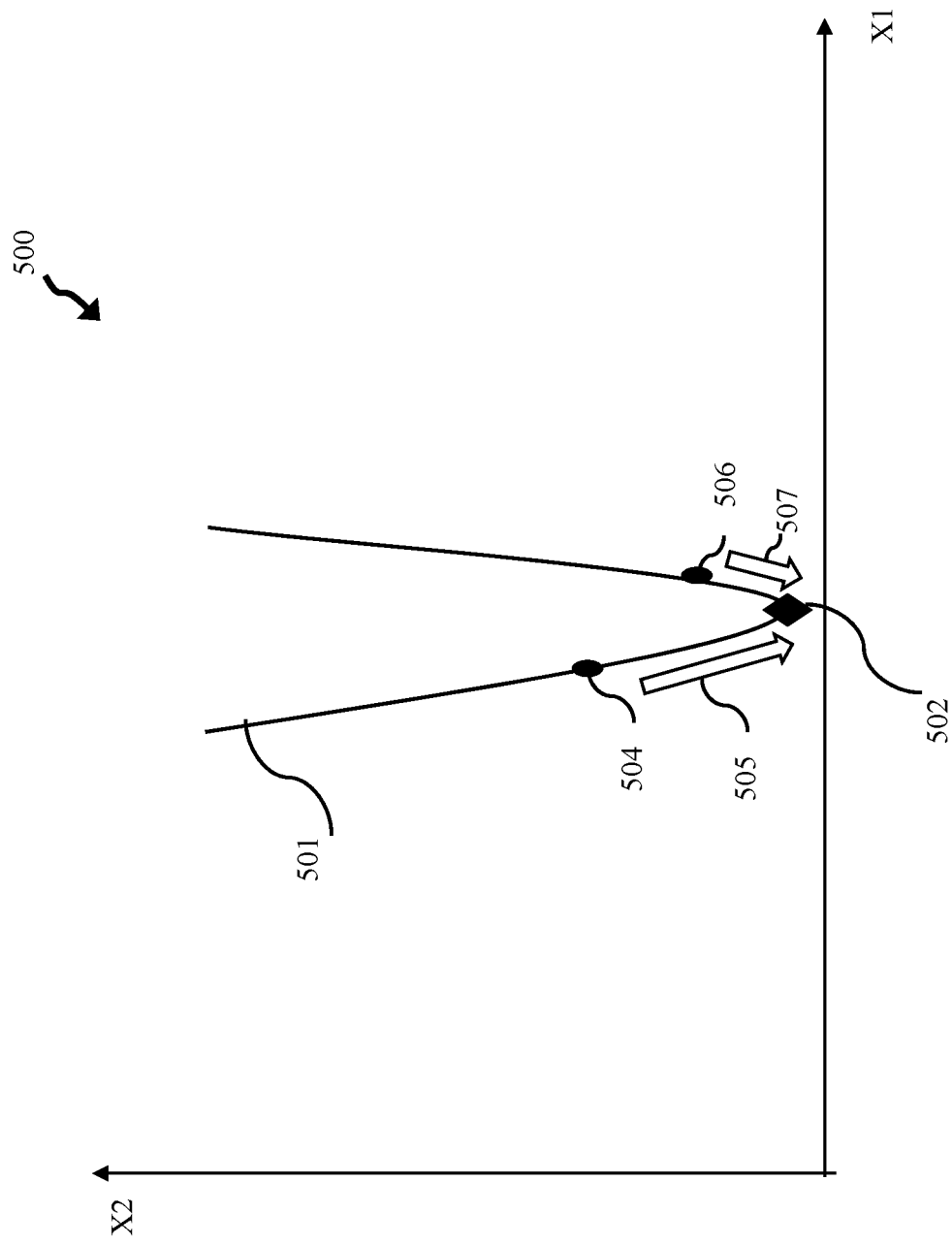
FIG. 5 is an example of the operation of the gradient descent algorithm, according to an exemplary embodiment.

One simple example of an optimization technique is the gradient descent optimization algorithm. FIG. 5 is an example 500 of the operation of the gradient descent algorithm being applied on a parabolic equation X2=f(X1), according to an exemplary embodiment. The parabolic equation is modeled by the quadratic function f(X1) indicated by parabola 501. As shown, the optimal (minimal) value of the function is at 502. In a first iteration, the equation f(X1) may return a data point on parabola 501 indicated by 504. To optimize data point 504 such that it becomes the value at data point 502, data point 504 may move in the direction of 505. The slope between data point 502 and 504 is negative, thus to move data point 504 in the direction of data point 502, a supplemental value may be added to data point 504 during a next iteration. Adding a supplemental value when the slope is negative may have the effect of moving data point 504 in the direction of 505.

During a next iteration, equation f(X1) with the addition of the supplemental value may return a data point on parabola 501 indicated by 506. To optimize data point 506 such that it becomes the value at data point 502, data point 506 may move in the direction of 507. The slope between data point 502 and 506 is positive, thus, to move data point 506 in the direction of data point 502, a supplemental value may be subtracted from data point 506 during the next iteration. Subtracting a supplemental value when the slope is positive may have the effect of moving data point 506 in the direction of 507. Therefore, data points 504 and 506 must move in the direction opposite of the slope of the parabola 501 to arrive at the desired data point 502. Thus, gradient descent may be performed such that data points may arrive close to their optimal minimal value. Equation 1 below shows determining the gradient descent of an cost function such that $f(x_n)$ better approximates $y_n$.

$$y_n = f(x_n) + h(x_n) \qquad \text{Equation 1}$$
$$h(x_n) = y_n - f(x_n)$$
$$y_n - f(x_n) = -\frac{\delta\ O(y_n, f(x_n))}{\delta\ f(x_n)}$$

In Equation 1 above, $y_n$ may be the desired value, $f(x_n)$ may be the function acting on input $x_n$, $h(x_n)$ is the supplemental value at $x_n$ added to improve the output of $f(x_n)$ such that $y_n=f(x_n)$, and $O(y_n, f(x_n))$ is the cost function that is used to optimize $h(x_n)$. Taking the derivative of an cost function with respect to $f(x_n)$ may return the supplemental value that improves $y_n=f(x_n)$.

FIG. 5 above describes the operation of the gradient descent optimization algorithm. In some implementations, a conjugate gradient optimization algorithm, which is a similar optimization algorithm, may be used. One difference between the algorithms is the search direction. For example, the gradient descent optimization algorithm takes steps every iteration to search for a global (or local) minimum. In contrast, the conjugate gradient optimization algorithm makes gradient vectors orthogonal against previous iterations of orthogonal vectors. Accordingly, both optimization algorithms optimize problems in different ways, which may lead to different results. In other examples, one common optimization algorithm called the particle swarm optimization algorithm uses particles (decision variables in solution space) to search for global (or local) minimum cooperatively. Each of the particles search the search space based on their own position, their own best position, and the swarm's best position. In contrast, genetic algorithms search a search space by iteratively selecting the most likely individuals (e.g., the most likely set of decision variables in the solution space) to competitively search the search space for the global (or local) minimum. Accordingly, the particle swarm algorithm searches for optimal solutions cooperatively and genetic algorithm searches for optimal solutions competitively. As discussed, the different optimization techniques may result in different optimal solutions. Accordingly, the analytics server 110a may execute multiple optimization techniques that optimize the cost functions. The analytics server 110a may execute the optimization techniques concurrently.

The analytics server 110a may execute multiple optimization techniques and display the results (or a portion of the results) of each of the optimization techniques to a user (e.g., a user using the remote device 150, a user using the onboard device 120a, and/or a user using a third party user device 140a). For example, the analytics server 110a may display a predetermined number of optimization results associated with the optimization techniques that converged the fastest. In some embodiments, the analytics server calculates acceptance probability scores (e.g., a likelihood that a user will accept or agree to the firefighting approach based on the optimization technique). The analytics server 110a may algorithmically or statistically determine acceptance probability scores using, for example, data associated with previous firefighting approaches (e.g., similar factors, similar priorities, similar geographic areas).

The analytics server 110a may also be configured to execute one or more different optimization techniques (or chains of optimization techniques). For example, the analytics server 110a may execute a chain of optimization techniques. In some embodiments, the chain of different optimization techniques may be predetermined by a user or dynamically determined by the analytics server 110a.

In some embodiments, the analytics server 110a executes the optimization technique(s) to determine an optimal firefighting approach with new (or revised) instruction(s), each time an instruction is performed (or completed) by a user (operating the remote device 150, onboard device 120a and/or the third party device 140a) or the aerial vehicle 120. In other embodiments, the analytics server 110a executes the optimization technique(s) to determine new (or revised) instruction(s) (e.g., a new or updated firefighting approach to the firefighting mission) in the event the analytics server 110a receives an indication (e.g., an indication of an updated factors and/or updated factor priorities).

The firefighting factors evolve (or are updated, change) as the firefighting mission evolves (e.g., as time passes). The firefighting factors evolve as the firefighting mission evolves over time. The analytics server 110a may be configured to monitor the firefighting factors to evaluate and/or track evolving factors. For example, the analytics server 110a may monitor factors received from sensors 120b to determine whether the factor data exceeds one or more thresholds (e.g., the temperature of the fire exceeds a threshold, the temperature of the fire increases by a predetermined amount, the temperature of the fire decrease by a predetermined amount).

As the firefighting mission evolves, the prioritizations of each of the factors may be manually re-evaluated (e.g., by a user) or dynamically re-evaluated (e.g., by an algorithm). For example, the analytics server 110a may receive re-evaluated factor prioritizations from users (e.g., users using the remote user device 150, users using the onboard device 120 of the aerial vehicle 120, and/or users using the third party user device 140a). In some embodiments, if a monitored factor satisfies one or more predetermined thresholds, the analytics server 110a may transmit a notification to one or more users, indicating that the factor has evolved and that the user may wish to re-evaluate one or more factors. For example, the analytics server 110a may identify a sudden large plume of smoke. The analytics server 110a may be configured to transmit a trigger to the user in the event of a sudden large plume of smoke indicating, for instance an occurrence of an explosion. Accordingly, a user may re-evaluate (e.g., increase the priority) of the building associated with the large plume of smoke in an attempt to fight the fire. In some embodiments, one factor's evolution may result in the user modifying prioritizations of multiple firefighting factors. In other embodiments, if a monitored factor information satisfies one or more predetermined thresholds, the analytics server 110a may execute a machine learning algorithm (e.g., reinforcement learning, neural networks) to re-evaluate the factor prioritization.

The analytics server 110a adapts (revises or improves) the displayed firefighting approach (including the one or more instructions) responsive to evolving factors associated with the evolving firefighting mission. The analytics server 110a may also display any differences between previous firefighting approaches to one or more users. For example, the analytics server 110a may determine the delta between an initial firefighting approach and a revised firefighting approach and display the delta to one or more electronic devices.

In an illustrative example, at the beginning of a mission, an area of water may be inaccessible to the automated (or partially automated) aircraft and/or other firefighting units. As the firefighting mission evolves, the area of water may become accessible (e.g., by putting out fires around the area of water and making the area of water accessible). In particular, a factor indicating "little water availability" or "100 gallons of water availability" may be increased in response to the newly accessible water reservoir. Accordingly, the analytics server 110a may generate a revised firefighting approach based on the evolving factors.

The analytics server 110a may also communicate the firefighting approach (including any one instruction or set of instructions), factors, and/or factor prioritizations to one or more downstream applications and/or one or more other servers (e.g., third party server 140c). For example, an instruction of a firefighting approach may be transmitted to a downstream application. The downstream application may be configured to generate one or more third party instructions in response to the received instruction from the analytics server 110a. For instance, the downstream application may be configured to generate instructions for firefighting members on the ground, other firefighting departments, instructions for one or more processors of an automated/partially automated aircraft, calling other firefighting departments for backup, calling rescue teams, and the like.

The remote user device 150 and/or third party devices 140 may be any computing devices comprising a processor and a non-transitory machine-readable storage medium capable of performing the various tasks and processes described herein. The remote user device 150 and/or third party devices 140 may be any device capable of communicating information to and from the other devices in the system 100. Non-limiting examples of remote user device 140 and/or third party user devices 140a include aircraft (e.g., planes, helicopters, drones, etc.), ground control devices, servers, data centers, base stations, or any other type of computing device. The third party database 140b may be database(s) associated with the third party that the analytics server 110a may query to retrieve historic factor information, for instance. For example, a third party database 140b may be a government database 140b that stores population densities of a particular area and/or financial infrastructure information.

The remote user device 150 and/or third party devices 140 may be a computing device operated by a user such as a system administrator, firefighter, fire captain, fire chief, or other city personnel. A user may use the remote user device 150 and/or third party devices 140 to display results determined by the analytics server 110 and as an electronic data sources to input factors, factor prioritizations, approvals/rejections/modifications of instructions, and the like. In some embodiments, third party devices 140 may have different privileges from the remote device 150 and/or the onboard device 120a.

The remote user device 150 and/or third party devices 140 transmit factors and/or prioritizations/reprioritizations of factors by ranking (weighing or biasing) factors. For example, as described herein, a user using the remote user device 150 and/or third party devices 140 may prioritize (encourage, weigh) factors using the interactive map generated by the analytics server 110a. Users may use keyboards, track pads, a touch display, text boxes, sliders, digital buttons, audio, and the like to prioritize factors. The factor prioritizations communicated to the analytics server 110a by the remote user device 150 (and/or third party devices 140) may be captured and stored in the analytics server 110b. The remote user device 150 and/or third party devices 140 can also communication location information, navigation information, and/or guidance information to the analytics server 110a.

The remote user device 150, along with the onboard device 120a and the third party device 140a, may be configured to display an optimized (or improved) instruction (or set of instructions) of the firefighting approach for a firefighting mission. For example, one or more instructions (or a delta between a previous firefighting approach/instruction(s) and an improved/optimized firefighting approach/instruction(s)) generated by the analytics server 110a may be displayed to the users.

The third party server 140c may be configured to receive firefighting approach information (e.g., one instruction or a set of instructions), factors, and/or factor prioritizations, and execute one or more third party applications. In some embodiments, upon executing the third party application, the third party server 140c may communicate information back to the analytics server 110a.

For example, the third party server 140c may receive factors from the analytics server 110a and trigger an action. In a non-limiting example, if the third party server 140c receives an indication that the firefighting mission has limited water availability, the third party server 140c may determine, upon executing a third party application, to support the firefighting mission by supplying additional water (e.g., instructing the deployment of additional firefighting units carrying water). In the example, the third party server 140c may communicate updated factors and/or prioritizations back to the analytics server 100a. Accordingly, the new (or updated) factor information may be received by the analytics server 110a and the analytics server 110a may determine a revised firefighting approach in response to optimizing the new (or updated) factors according to the same (or different) cost function. In some embodiments, the analytics server 110a may transmit a notification to a user using the remote device 150 or a user using the onboard device 120a to approve and/or confirm the updated factors (and any prioritizations) received by the third party server 110c.

The aerial vehicle 120 may be any type of aircraft, such as a fixed-wing aircraft (e.g., with a propeller or jet engine), a rotorcraft (e.g., a helicopter, an autogyro, or a gyrodone), or an aerostat (e.g., an airship or dirigible), among others. The aerial vehicle 120 may be operated by one or more pilots. In some embodiments, the aerial vehicle 120 can be an autonomous aircraft (or semi-autonomous), which is piloted at least in part by an autonomy system and/or other flight control system. The autonomy system and/or other flight control system may be configured to navigate the aerial vehicle 120 with no input or remote input (e.g., from the remote user device 150) while traveling through an environment. While discussed primarily in terms of an air vehicle, land-bound vehicles (e.g., a sedan car, a truck, a van, or a bus) and seaborne vehicles (e.g., a ship, a frigate, or a hydrofoil ship) may be also applicable.

The aerial vehicle 120 can be dispatched to address one or more remote missions. The remote missions include, for example, aerial firefighting missions (e.g., a firefighting mission), search and rescue missions, and/or aerial reconnaissance missions. In some embodiments, the aerial vehicle 120 may receive instruction(s) generated by the analytics server 110a and/or input via users to further the completion of the remote mission. In embodiments where the aerial vehicle 120 is dispatched for a firefighting mission, the aerial vehicle 120 may be equipped with one or more fire suppression devices (not pictured) such as water or other flame retardant materials. The aerial vehicle 120 can communicate with the analytics server 110a, remote user device 150 and/or the third party device 140 using the network 130.

The sensors 120b can be mounted on the interior or the exterior of the aerial vehicle 120. Non-limiting examples of the sensors 120 include LiDAR sensors, visible light sensors (e.g., cameras, video capture devices, etc.), infrared light sensors, accelerometers, gyroscopes, elevation sensors, pressure sensors, temperature sensors, force sensors, proximity sensors, radar sensors, angle-of-attack sensors, global positioning system (GPS) sensors, thermal infrared cameras, and thermal imaging cameras, among others. Sensor information can be retrieved from the sensors 120b by the onboard device 120a, the analytics server 110a, and/or the remote user device 150. In some implementations, one or more of the sensors 120b can provide sensor data periodically (e.g., in a batch transmission, etc.) to the onboard device 120a, the analytics server 110a, and/or the remote user device 150. In some implementations, one or more of the sensors 120b can provide sensor data to the onboard device 120a, the analytics server 110a, and/or the remote user device 150 upon receiving a request for sensor data from onboard device 120a, the analytics server 110a, and/or the remote user device 150.

The onboard device 120a may be configured with one or more electronic displays. The electronic display may be any type of device capable of presenting information to a user that may be operating (manually, partially manually) the aerial vehicle 120. Types of electronic displays can include liquid crystal displays (LCDs), light-emitting diode (LED) displays, organic light-emitting diode (OLED) displays, or bi-stable displays, among others. One or more electronic displays of the onboard device 120a may be positioned within the aerial vehicle 120 such that the displays can be viewed while the user is operating the aerial vehicle 120. The onboard device may be configured to display information such as aerial vehicle 120 speed, aerial vehicle 120 direction, aerial vehicle 120 velocity, aerial vehicle 120 location, one or more instructions associated with the firefighting mission (e.g., pour water on an area, disperse fire retardant, navigate to particular coordinates, land), a destination location, an interactive map, firefighting factors (e.g., temperature, wind speed, time to refuel, infrastructure value, available water) one or more other user identifiers (names, numbers, rankings) that have access to the same or similar content being displayed on electronic device(s) of the onboard device 120a, and the like. The onboard device 120a may also include electronic flight instrument system (EFIS), which can include one or more primary flight displays, one or more multi-function displays, or other displays.

The onboard device 120a may receive instructions (or a set of instructions) from the analytics server 110a to perform an action (e.g., collect water, return to a location, land) based on the firefighting approach. As discussed herein, in some embodiments, before the onboard device 120a executes the instruction(s) and commands the aerial vehicle 120, the instruction(s) may be approved by a user using the onboard device 120a and/or a remote user device 150. In other embodiments, the onboard device 120a executes the instruction(s) and commands the aerial vehicle 120 without any user intervention The analytics database 110b may store various algorithms and/or models that may be employed by the analytics server 110a to optimize a firefighting approach given factors and associated factor prioritizations. The analytics database 110b may also store various historic factors and associated factor prioritizations associated with particular areas. Storing various historic factors and associated factor prioritizations may reduce the need for the analytics server 110c to query third party databases 102b for historic factors and associated factor prioritizations, during a firefighting mission, thereby reducing latency. The stored historic factors and associated factor prioritizations may also be utilized by the analytics server 110a to train (or retrain) models that predict factor prioritizations (as discussed with reference to FIGS. 3 and 4).

In some embodiments, the analytics server 110a may query the third party database 140b periodically (e.g., daily, monthly, quarterly) for updated factors and/or associated factor prioritizations to be stored by the analytics database 110b. In other embodiments, the analytics database 110b may update factors and/or factor prioritizations in response to receiving updated factors and/or factor prioritizations from third party databases 140b. In other embodiments, the analytics server 110a may update the factors in the analytics database 110b (e.g., during a firefighting mission, in response to receiving factor information from the user device 150, third party user device 140a and/or onboard user device 120a) in real-time (or near real time) as the firefighting mission evolves.

In some embodiments, the analytics server 110a may retrieve factors from a database (e.g., the analytics database 110b and/or the third party database 140b) that conflict with factors extracted from sensors 120b. In some embodiments, the factors extracted from the sensors 120b may override the retrieved factors from the databases. In some embodiments, one or more users may approve/reject/modify the factors extracted from the sensors 120b before overriding the retrieved factors from the databases. In some embodiments, if one or more users approves the extracted sensor 120b factors, the analytics server 110a may update the factors stored in the databases.

In an example operation, an operator may input initial factor information at the beginning of a firefighting mission in remote user device 150. For example, an operator may receive an indication of a fire at a particular area and input factors such as a population density of the area and an infrastructure value of the area. The analytics server 110a then uses the initial factors to generate a firefighting approach (and instructions to accomplish the initial firefighting approach) by optimizing a cost function quantifying one success metric of the mission. As the firefighting mission evolves (e.g., the sensors 120b starts collecting data of the fire and transmitting captured frames to the analytics server 110a), the analytics server 110a receives additional and/or updated factors (e.g., the sensors 120b have collected information about a new factor). Accordingly, the analytics server 110a optimizes (or improves) the firefighting approach by re-optimizing the cost function utilizing the systems and methods described herein. The analytics server 110a may display one or more instructions of the revised firefighting approach to the onboard device 120a, the remote user device 150, and/or third party user devices 140a and/or trigger an action in response to the revised firefighting approach (e.g., transmit a notification to an operator of the remote user device 150, transmit a notification to a third party user device 140a, execute a fire suppression action, navigate to a particular area).

Figure 6:
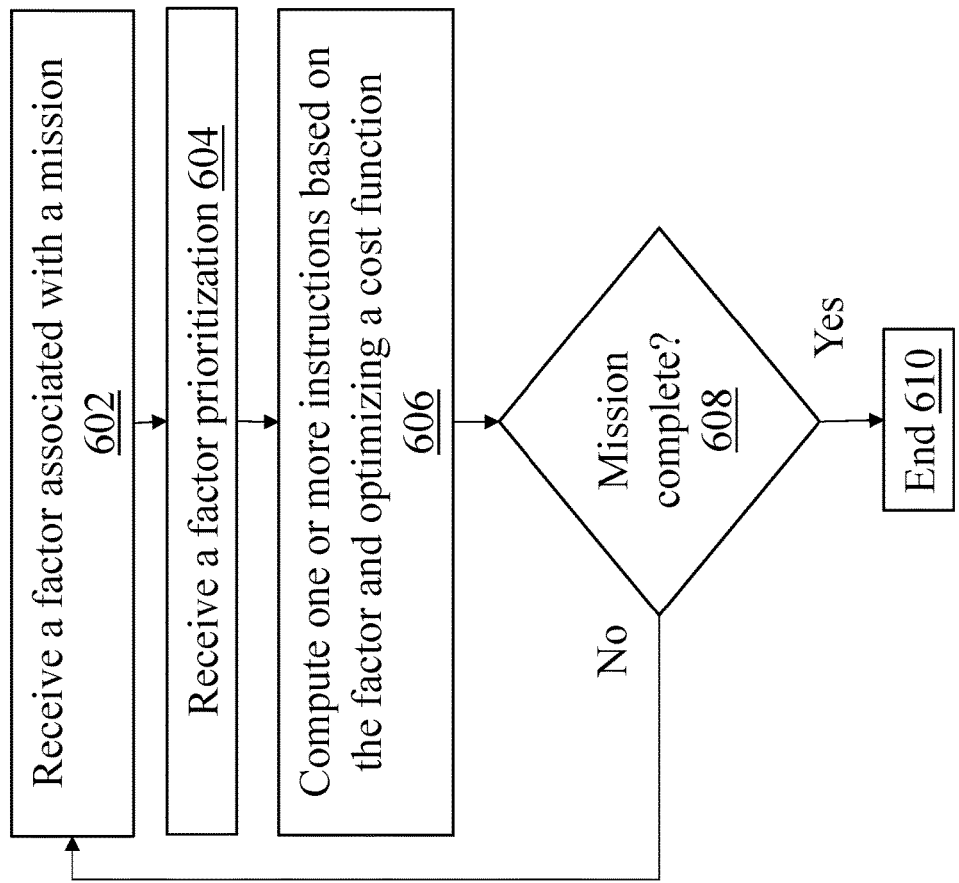
FIG. 6 is a flow chart for optimizing instructions directed to facilitating the completion of a mission in an evolving environment, according to an exemplary embodiment.

FIG. 6 is a flow chart for optimizing instructions directed to facilitating the completion of a mission in an evolving environment, according to an exemplary embodiment. The method may be implemented by an analytics server (or other computing device) in a prioritized fire suppression system. Some embodiments may include additional, fewer, or different operations than those described in the method 600 and shown in FIG. 6. The various operations of the method 600 may be performed by one or more processors executing on any number of computing devices.

A vehicle, such as an aerial vehicle (e.g., aerial vehicle 120 in FIG. 1) may be deployed for one or more missions. Completing the mission may include completing one or more tasks associated with the mission. Each task may be completed upon executing one or more instructions (or a set/sequence of instructions). For example, a mission task associated with an aerial firefighting mission may include extinguishing one particular fire (of various fires identified in the aerial firefighting mission). One set of instructions associated with the task of extinguishing the particular fire includes navigating to the particular fire (e.g., stay straight until coordinates (x,y), turn left at the next building, decrease altitude to 100 feet). An additional instruction associated with the task of extinguishing the particular fire includes dousing an area with water or dispersing fire retardant.

Various aspects of the mission and/or task can be quantified using factors. For example, firefighting factors are used to describe characteristics of the fire (e.g., hot spots, temperature of the fire, flame front), characteristics of the area associated with the fire (e.g., population densities, infrastructure values, water availability, wind direction, wind speed), constraints associated with a particular task and/or mission (e.g., limited units, limited water availability, poor water quality, extended refueling durations), and the like.

In block 602, the analytics server receives factor(s) associated with a mission. Factors may be received by the analytics server in response to capturing data. For example, sensors may be utilized to capture data associated with the mission and/or various tasks of the mission. For instance, sensors may capture firefighting factors such as wind speed, wind direction, hot spots, temperature of the fire, population densities, and the like.

Factors may also be received by the analytics server in response to user inputs. For example, one or more users may be queried for factor information. Factor information may also be retrieved from one or more data repositories. For example, the analytics server may retrieve factor information from memory and/or one or more databases. For example, the analytics server may query a third party database to retrieve factors.

In block 604, the analytics server receives factor prioritizations. As discussed, factors describe an aspect or characteristic of the mission, but factor prioritizations indicate a weight (bias, or other ranking) associated with the factor describing an aspect or characteristic of the mission. In some embodiments, the analytics server equally initializes each factor (e.g., factors may not have a prioritization). In some embodiments, the analytics server may retrieve a historic factor prioritization from memory and/or other data repository. In some embodiments, the user may input a factor prioritization. If the user does not input a factor prioritization, the analytics server may prompt the user for a factor prioritization. In yet other embodiments, the analytics server may predict a factor prioritization using a machine learning model.

In an illustrative example, the analytics server may receive an indication that a hospital is present in the firefighting area. However, the hospital may not be ranked as a high priority factor (or may not be prioritized at all) because of the current circumstances of the firefighting mission (e.g., the fire is a predetermined threshold distance away from the hospital, the wind direction is blowing in the direction opposite of the hospital). However, as one or more factors evolve (e.g., wind direction changes to blow in the direction of the hospital, water availability decreases as the firefighting mission evolves), a user may re-evaluate the prioritization of the hospital factor. When the prioritization of a factor increases, one or more sets of instructions may be generated that bias completing a task associated with that factor. For example, when the factor prioritization of the hospital increases, the tasks associated with extinguishing a particular fire may shift to protecting the hospital from the particular fire. Accordingly, the factor prioritizations bias the instructions and tasks associated with completing the mission.

In operation 606, the analytics server computes one or more instructions based on the factor(s) and optimizing a cost function. The cost function may be defined to quantify the success of the mission. The mission is successful when the mission is completed. Examples of optimizing cost functions may include minimizing the structural damage of the fire, minimizing the human injury of the fire, minimizing the duration of the fire, and the like.

When optimizing the cost function, the factors (and the associated rankings/prioritizations) may become constraints to a multi-constraint optimization problem. For example, factors that may be configured into constraints include a number of available firefighting units, the amount of available water, and the like. In other embodiments, the firefighting factors (and associated rankings/prioritizations) may become bounds (or tolerances). In some embodiments, the analytics server may adjust multiple cost functions using multiple factors.

The cost function is optimized by finding solutions of decision variables. Decision variables represent the different instructions that may be determined by the analytics server. Optimizing the cost function involves finding the optimal decision variables (e.g., instructions). The decision variables that are determined to optimize the cost function are the instructions that are determined by the analytics server. In some embodiments, the instructions may be further weighted by the factor prioritizations. In response to the analytics server determining one or more instructions (or sets of instructions) that are optimized given the various factors and/or factor prioritizations, one or more users may approve/reject and/or modify the instructions.

The decision 608 evaluates whether the mission is complete and ends at operation 610. If the mission is not complete (e.g., there is still a fire in a particular area), then the method 600 iteratively repeats until the mission is complete. That is, the analytics server may receive updated factors (e.g., evolved factors) in operation 602, receive updated factor prioritizations in operation 604 (e.g., evolved factor prioritizations) and compute optimal instruction(s) based on the optimizing the cost function with the evolved factors and/or factor prioritizations in operation 606 until the mission is complete. The analytics server may determine that a mission is complete when each task is completed. The analytic server may determine that the tasks are complete in response to a user input and/or in response to captured sensor information. For example, the analytics server may not identify any remaining fire in an aerial firefighting mission.

Figure 7:
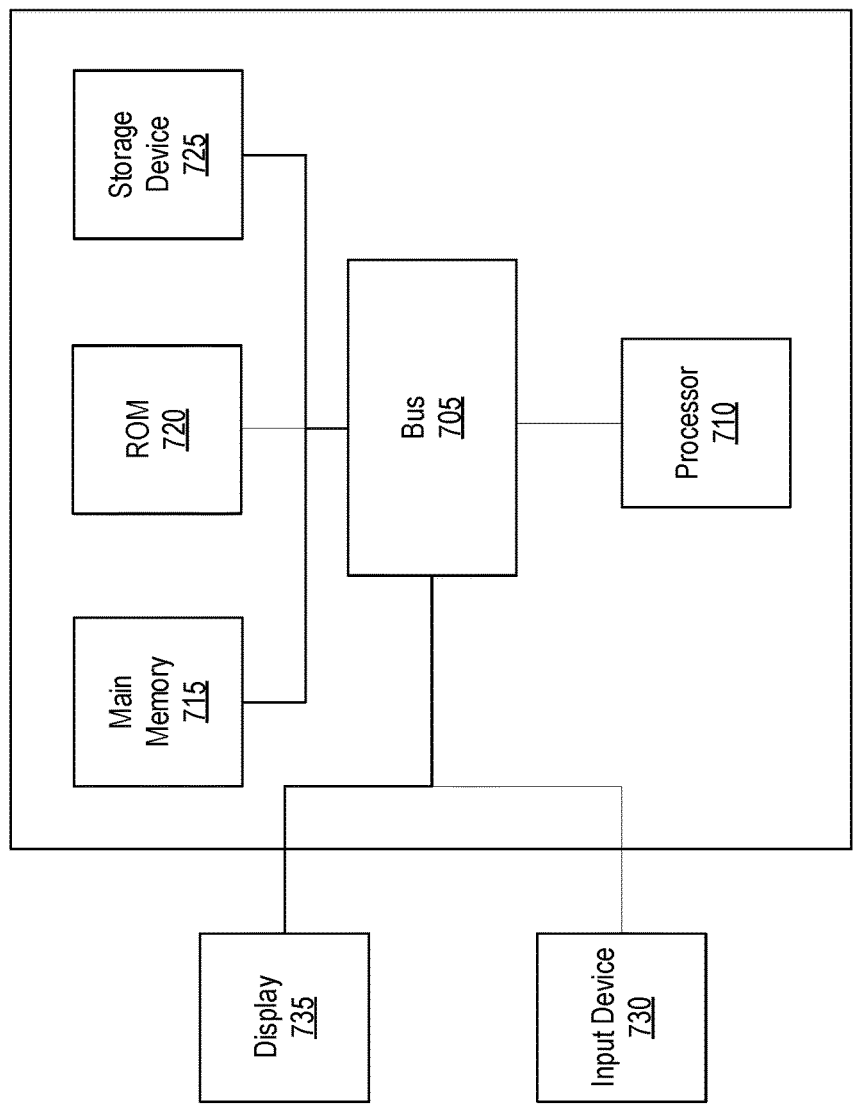
FIG. 7 is a block diagram of an example computer system, according to an exemplary embodiment.

Referring now to FIG. 7, depicted is a block diagram of an example computer system 700, according to an exemplary embodiment. The computer system or computing device 700 can include or be used to implement the system 100, or its components such as the remote user device 150, the third party device 140, and/or the onboard user device 120*a*. The computing system 700 includes at least one bus 705 or other communication component for communicating information and at least one processor 710 or processing circuit coupled to the bus 705 for processing information. The computing system 700 can also include one or more processors 710 or processing circuits coupled to the bus 705 for processing information. The computing system 700 also includes at least one main memory 715, such as a random access memory (RAM) or other dynamic storage device, coupled to the bus 705 for storing information, and instructions to be executed by the processor 710. The computing system 700 may further include at least one read only memory (ROM) 720 or other static storage device coupled to the bus 705 for storing static information and instructions for the processor 710. A storage device 575, such as a solid state device, magnetic disk, or optical disk, can be coupled to the bus 705 to persistently store information and instructions.

The computing system 700 may be coupled via the bus 705 to a display 735, such as a liquid crystal display, or active matrix display, for displaying information to a user such as an administrator of the data processing system. An input device 730, such as a keyboard or voice interface may be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735. The display 735 can be part of the onboard user device 120a, remote device 150, or other components of FIG. 1.

The processes, systems, and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system.

A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What we claim is:

1. A system for operating an autonomous aircraft using machine learning to perform an aerial fire suppression mission in an environment, comprising:
    one or more sensors mounted on the autonomous aircraft;
    a transceiver configured to communicate with the autonomous aircraft; and
    an analytics server comprising at least one processor coupled to memory storing processor-readable instructions, the instructions causing the at least one processor to:
        train a machine-learning model using input-output pairs and a difference between a predicted output of the machine-learning model and an output of the input-output pairs, each input-output pair comprising:
            an input corresponding to one or more target historic factors of a historic fire suppression mission; and
            the output corresponding to a historic factor prioritization associated with the one or more target historic factors;
        determine an instruction to perform a fire suppressing action based on a prioritization of a plurality of factors determined by the trained machine-learning model;
        control the autonomous aircraft via the transceiver to cause the autonomous aircraft to perform the fire suppressing action of the instruction;
        receive, via the transceiver, sensor data from the one or more sensors;
        generate a plurality of heat maps using the sensor data;
        generate a time-derivative of the plurality of heat maps indicating a direction of a flame path in the environment while the autonomous aircraft performs the fire suppressing action;
        determine, using the time-derivative of the plurality of heat maps, a modification to the instruction in real-time responding to the direction of the flame path based on a update to the prioritization of the plurality of factors determined by the trained machine-learning model from the sensor data; and
        control, in real-time via the transceiver, the autonomous aircraft to perform a modified fire suppressing action to respond to the direction of the flame path in the environment.

2. The system of claim 1, wherein the prioritization comprises an evolved factor prioritization, the evolved factor prioritization being the prioritization of factors at a later point in time.

3. The system of claim 2, wherein the at least one processor is further configured to adjust a plurality of cost functions and transmit a plurality of instructions based on each of the adjusted cost functions to an electronic display.

4. The system of claim 2, wherein the at least one processor is further configured to compute the instruction directed to facilitating completion of the aerial fire suppression mission based on a chain of cost functions.

5. The system of claim 2, wherein a factor of the plurality of factors comprises an evolved factor, the evolved factor being received at a later point in time after a determination of the prioritization.

6. The system of claim 5, wherein the one or more sensors are configured to continuously sense an evolving environment to capture the evolved factor.

7. The system of claim 2, wherein the instruction comprises data to navigate the autonomous aircraft.

8. The system of claim 2, wherein the at least one processor is configured to determine multiple factor prioritizations and compute the instruction based on algorithmically combining multiple instructions directed to facilitating completion of the mission, each of the multiple instructions directed to facilitating the completion of the aerial fire suppression mission based on optimizing a cost function with respect to a received factor prioritization of received multiple factor prioritizations, wherein the algorithmic combination of the multiple instructions is based on the multiple factor prioritizations.

9. The system of claim 2, wherein the at least one processor is configured to compute a sequence of instructions directed to facilitating completion of the aerial fire suppression mission.

10. A method for operating an autonomous aircraft using machine learning to perform an aerial fire suppression mission in an environment comprising:
    training, by at least one processor of an analytics server, a machine-learning model using input-output pairs and a difference between a predicted output of the machine-learning model and an output of the input-output pairs, each input-output pair comprising:
        an input corresponding to one or more target historic factors of a historic fire suppression mission; and
        the output corresponding to a historic factor prioritization associated with the one or more target historic factors;
    determining, by the at least one processor of the analytics server, an instruction to perform a fire suppressing action based on a prioritization of a plurality of factors determined by the trained machine-learning model; and
    controlling, by the at least one processor of the analytics server, the autonomous aircraft via a transceiver to cause the autonomous aircraft to perform the fire suppressing action of the instruction;

receiving, by the at least one processor of the analytics server, via the transceiver, sensor data from one or more sensors;

generating, by the at least one processor of the analytics server, a plurality of heat maps using the sensor data;

generating, by the at least one processor of the analytics server, a time-derivative of the plurality of heat maps indicating a direction of a flame path in the environment while the autonomous aircraft performs the fire suppressing action;

determining, by the at least one processor of the analytics server, using the time-derivative of the plurality of heat maps, a modification to the instruction in real-time responding to the direction of the flame path based on a update to the prioritization of the plurality of factors determined by the trained machine-learning model from the sensor data; and controlling, by the at least one processor of the analytics server, in real-time via the transceiver, the autonomous aircraft to perform a modified fire suppressing action to respond to the direction of the flame path in the environment.

* * * * *